United States Patent [19]
Okamoto et al.

[11] Patent Number: 5,900,323
[45] Date of Patent: May 4, 1999

[54] MAGNETIC RECORDING MEDIUM AND MAGNETIC RECORDING DRIVE

[75] Inventors: Iwao Okamoto; Hideyuki Akimoto; Masayoshi Shinohara, all of Kanagawa, Japan

[73] Assignee: Fujitsu Limited, Kawasaki, Japan

[21] Appl. No.: 08/537,432

[22] Filed: Oct. 2, 1995

[30] Foreign Application Priority Data

Feb. 20, 1995 [JP] Japan ........................................ 7-31210

[51] Int. Cl.$^6$ ........................................................ G11B 5/66
[52] U.S. Cl. ........................ 428/611; 428/336; 428/635; 428/667; 428/674; 428/694 TS; 428/694 TM; 428/900
[58] Field of Search ..................................... 428/336, 611, 428/635, 667, 674, 694 TS, 694 TM, 900

[56] References Cited

U.S. PATENT DOCUMENTS

| | | | |
|---|---|---|---|
| 4,833,020 | 5/1989 | Shiroishi et al. | 428/336 |
| 5,047,274 | 9/1991 | Tsuya et al. | 428/64 |
| 5,277,960 | 1/1994 | Tsuya et al. | 428/119 |
| 5,370,928 | 12/1994 | Funabashi et al. | 428/336 |
| 5,413,835 | 5/1995 | Ikeda et al. | 428/141 |
| 5,427,867 | 6/1995 | Kogure et al. | 428/611 |
| 5,482,785 | 1/1996 | Mahvan et al. | 428/611 |

FOREIGN PATENT DOCUMENTS

| | | |
|---|---|---|
| 55-157130 | 12/1980 | Japan . |
| 59-142744 | 8/1984 | Japan . |
| 61-237231 | 10/1986 | Japan . |
| 62-103823 | 5/1987 | Japan . |
| 63-187416 | 8/1988 | Japan . |
| 2-73511 | 3/1990 | Japan . |
| 4-134618 | 5/1992 | Japan . |
| 5-36052 | 2/1993 | Japan . |
| 6-76260 | 3/1994 | Japan . |
| 6-96431 | 4/1994 | Japan . |

OTHER PUBLICATIONS

Laminated CoPtCx/Cr Films For Low Noise Longitudinal Recording, Yang, et al., IEEE Transactions on Magnetics, vol. 27, No. 6, Nov. 1991, pp. 5052–5054.

Primary Examiner—Stevan A. Resan
Attorney, Agent, or Firm—Greer, Burns & Crain, Ltd.

[57] ABSTRACT

A non-magnetic substrate, a Cu layer having a film thickness ranging from 0.5 to 10 nm, a Cr layer having a film thickness of 100 nm or less, a magnetic layer made of CoCrPt alloy in which a percentage content of Cr ranges from 12 atoms % to 20 atoms % and a percentage content of Pt ranges from 4 atoms % to 18 atoms %, a protective layer and a lubricating layer are arranged in that order to form a magnetic recording medium. Because the Cu layer is sufficiently thinned, a medium noise is sufficiently reduced, and a medium S/N ratio is sufficiently heightened. Because the film thickness of the Cr layer is 100 nm or less, the medium noise is reduced. Because the composition of CoCrPt alloy is limited in the magnetic layer, the medium S/N ratio is heightened. In addition, it is preferred that another Cu layer having a film thickness ranging from 0.5 to 10 nm be inserted into the magnetic layer to divide the magnetic layer into two layers. In this case, the medium noise is reduced by 20%, and the medium S/N ratio is heightened. Therefore, even though a magnetoresistive effect type magnetic head is used to record or reproduce information in/from the magnetic recording medium, the medium noise is sufficiently reduced, and the medium R/N ratio is sufficiently heightened.

15 Claims, 10 Drawing Sheets a : 7.1 dB
b : 18.4 dB
c : 18.7 dB
d : 18.0 dB
e : 16.8 dB
f : 15.7 dB
g : 16.2 dB

MAGNETIC RECORDING MEDIUM AND MAGNETIC RECORDING DRIVE

BACKGROUND OF THE INVENTION

1. Field of the Invention

The present invention relates generally to a magnetic recording medium and a magnetic recording drive, and more particularly to a magnetic recording medium composed of a Cr layer and a CoCrPt type alloy film arranged on the Cr layer and a magnetic recording drive having the magnetic recording medium.

2. Description of the Prior Art

In a field of a magnetic disk drive, a magnetoresistive effect type magnetic head (hereinafter, called an MR head) is put to practical use in place of a magnetic induction type magnetic head, and the MR head has been recently used for a magnetic recording drive.

In cases where the MR head is used, magnetic recording information can be detected at a higher sensitivity as compared with the use of the magnetic induction type magnetic head, and superior reproduction characteristics in a band region extending to a high frequency band can be obtained. However, because a medium noise is also detected to a high degree, a signal-to-noise ratio (S/N ratio) in the magnetic disk drive deteriorates.

Also, because the recording in a high recording density is required, a magnetic recording medium is required to have a high coercive force (Hc) on condition that a Br·t value is low. The Br·t value is defined as a product of a residual magnetic flux density (Br) in a magnetic recording medium layer and a thickness (t) of the magnetic recording medium layer. As a material having a high coercive force, the use of a CoCrPt alloy is expected. In cases where a medium made of only the CoCrPt alloy is used, a medium noise occurs to a high degree. Therefore, in cases where a CoCrPt alloy type medium is used as a magnetic recording medium, it is required to extremely reduce the medium noise by changing a structure of the magnetic recording medium for the purpose of improving the signal-to-noise ratio in the recording disk drive.

To produce a magnetic recording medium satisfying the above request, a literature (1) "Yang et al., IEEE, Mag-27 (1991) 5052" is reported. In the literature, an idea that a CoCrPt type medium layer and a Cr layer having a thickness of about 3 nm are alternately arranged to reduce a medium noise of a medium while maintaining the coercive force to a high value is disclosed.

However, a Br·t value of the medium in the literature (1) is about 200 G$\mu$m, and the improvement of the medium is required to apply the CoCrPt type medium layers to the MR head.

Also, another idea that a Cu film having a thickness of 2000 is arranged between a Cr film arranged under a Co type alloy magnetic film and a substrate to reduce a medium noise of a medium is disclosed in the Published Unexamined Japanese Patent Application No. H4-134618 (134618/1992). In addition, another idea that a Cu film having a thin thickness is arranged between a Cr layer arranged under a magnetic film and a substrate to heighten a coercive force of a medium is disclosed in the Published Unexamined Japanese Patent Application No. H6-96431 (96431/1994).

Also, another idea that a medium is produced by dividing a Co-group alloy medium layer into a plurality of divided layers through Cu layers to alternately arrange the divided layer and the Cu layer is disclosed in the Published Unexamined Japanese Patent Application No. S59-142744 (142744/1984). In this idea, upper divided layers of the Co-group alloy medium layer are used as read and write layers (R/W layers), and lower divided layers of the Co-group alloy medium layer are used as a marker signal for positioning a head. Therefore, the configuration of the medium is determined without considering the formation of the medium having a low medium noise and a high recording density. In this case, a film thickness of each Cu layer ranges from 0.2 to 0.8 $\mu$m to avoid the interference between recorded information in the upper divided layers and recorded information in the lower divided layers.

However, even though the Cu layers having the above-described thickness are arranged between a Cr backing layer and a substrate, a medium noise cannot be sufficiently reduced during a recording or reproducing operation, and information cannot be sufficiently recorded in a high recording density in a magnetic recording drive.

SUMMARY OF THE INVENTION

An object of the present invention is to provide, with due consideration to the drawbacks of such a conventional magnetic recording medium and a conventional magnetic recording drive, a magnetic recording medium in which a property of a signal-to-noise ratio (called a medium R/N ratio) is superior to that in the conventional medium on condition that a medium noise is sufficiently reduced. Also, the object is to provide a magnetic recording drive having the magnetic recording medium.

The object is achieved by the provision of a magnetic recording medium, comprising: a non-magnetic substrate; an intermediate layer arranged on the non-magnetic substrate, a film thickness of the intermediate layer ranging from 0.5 nm to 10 nm, and the intermediate layer being made of copper or a material including copper as a primary component; a non-magnetic crystal control layer arranged on the intermediate layer, the non-magnetic crystal control layer being made of chromium or a material in which chromium is included as a primary component; and a magnetic layer arranged on the non-magnetic crystal control layer, the magnetic layer being made of alloy in which Co, Cr and Pt are included.

In the above configuration, the intermediate layer made of copper or a material including copper as a primary component is arranged between the non-magnetic substrate and the non-magnetic crystal control layer. The material including copper as a primary component contains 50% by weight of the copper. Because the film thickness of the intermediate layer ranges from 0.5 nm to 10 nm, all surface of the non-magnetic substrate layer is not covered with the intermediate layer, but the intermediate layer formed in an island shape is arranged on the non-magnetic substrate layer. Therefore, in cases where the non-magnetic crystal control layer made of chromium or a material in which chromium is included as a primary component is arranged on the intermediate layer, a portion of the non-magnetic substrate layer not covered with the intermediate layer is directly covered with the non-magnetic crystal control layer. Therefore, a crystal structure of the non-magnetic crystal control layer is made fine as compared with that of the non-magnetic crystal control layer arranged on an intermediate layer having a thick film thickness. Also, a crystal structure of the magnetic layer arranged on the non-magnetic crystal control layer is also made fine.

Accordingly, a medium noise of the magnetic recording medium can be reduced, and a medium S/N ratio can be heightened. This effect is experimentally ascertained.

The object is also achieved by the provision of a magnetic recording medium, comprising:

a non-magnetic substrate;

a non-magnetic crystal control layer arranged on the non-magnetic substrate, the non-magnetic crystal control layer being made of chromium or a material in which chromium is included as a primary component;

a magnetic layer arranged on the non-magnetic crystal control layer, the magnetic layer being made of alloy in which Co, Cr and Pt are included; and an intermediate layer for dividing the magnetic layer into a plurality of divided magnetic layers arranged in a film thickness direction of the magnetic layer, a film thickness of the intermediate layer ranging from 0.5 nm to 10 nm, and the intermediate layer being made of copper or a material including copper as a primary component.

In the above configuration, the intermediate layer made of copper or a material including copper as a primary component is arranged between the divided magnetic layers made of CoCrPt alloy. Because the film thickness of the intermediate layer ranges from 0.5 nm to 10 nm, a crystal structure of the divided magnetic layer arranged on the intermediate layer is made fine as compared with that of a divided magnetic layer arranged on an intermediate layer having a thick film thickness, in the same manner.

Accordingly, a medium noise of the magnetic recording medium can be reduced, and a medium S/N ratio can be heightened.

The object is also achieved by the provision of a magnetic recording medium, comprising: a non-magnetic substrate; a first intermediate layer arranged on the non-magnetic substrate, a film thickness of the first intermediate layer ranging from 0.5 nm to 10 nm, and the first intermediate layer being made of copper or a material including copper as a primary component; a non-magnetic crystal control layer arranged on the first intermediate layer, the non-magnetic crystal control layer being made of chromium or a material in which chromium is included as a primary component;

a magnetic layer arranged on the non-magnetic crystal control layer, the magnetic layer being made of alloy in which Co, Cr and Pt are included; and a second intermediate layer for dividing the magnetic layer into a plurality of divided magnetic layers arranged in a film thickness direction of the magnetic layer, a film thickness of the second intermediate layer ranging from 0.5 nm to 10 nm, and the second intermediate layer being made of copper or a material including copper as a primary component.

In the above configuration, the first intermediate layer made of copper or a material including copper as a primary component is arranged between the non-magnetic substrate and the non-magnetic crystal control layer, and the second intermediate layer made of copper or a material including copper as a primary component is arranged between the divided magnetic layers made of CoCrPt alloy. Because the film thickness of each of the first and second intermediate layers ranges from 0.5 nm to 10 nm, a crystal structure of the non-magnetic crystal control layer is made fine, a crystal structure of the magnetic layer arranged on the non-magnetic crystal control layer is also made fine, and a crystal structure of the divided magnetic layer arranged on the intermediate layer is made fine.

Accordingly, a medium noise of the magnetic recording medium can be reduced, and a medium S/N ratio can be heightened.

It is preferred that a film thickness of the non-magnetic crystal control layer be 100 nm or less.

In this case, the medium noise of the magnetic recording medium is sufficiently reduced.

Also, it is preferred that a percentage content of Cr in the magnetic layer range from 12 atoms % to 20 atoms % and a percentage content of Pt in the magnetic layer range from 4 atoms % to 18 atoms %.

In this case, a coercive force and a medium S/N ratio of the magnetic recording medium is sufficiently heightened.

Also, it is preferred that a Br·t value of the magnetic layer defined as a product of a residual magnetic flux density in the magnetic layer and a thickness of the magnetic layer be 150 G$\mu$m or less.

In cases where a magnetoresistive effect type magnetic head having a high sensitivity property is used to record or reproduce information in/from the magnetic recording drive, it is required to prevent the magnetization of a magnetoresistance device from being saturated. Therefore, the Br·t value is set to 150 G$\mu$m or less to sufficiently weaken a magnetic field generated by the magnetic recording medium.

DETAIL DESCRIPTION OF THE EMBODIMENTS (First Embodiment)

Figure 1:
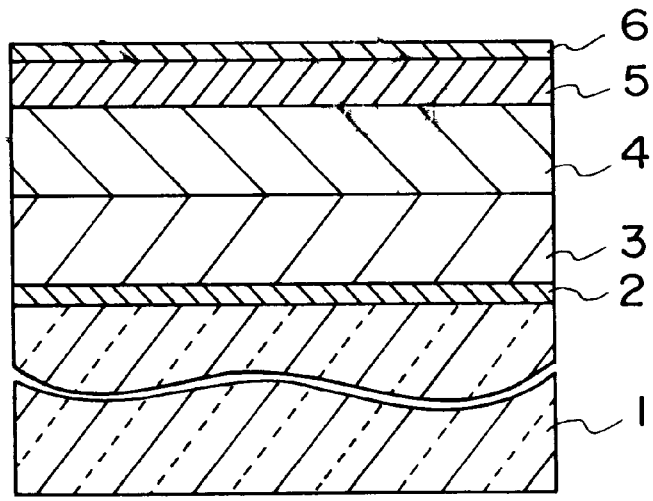
FIG. 1 is a cross sectional view of a magnetic recording medium according to a first embodiment of the present invention.

FIG. 1 is a cross sectional view of a magnetic recording medium according to a first embodiment of the present invention.

As shown in FIG. 1, a magnetic recording medium according to a first embodiment comprises a non-magnetic substrate 1, a Cu layer (or an intermediate layer) 2 having a film thickness ranging from 0.5 to 10 nm, a Cr layer (or a non-magnetic crystal control layer) 3 having a film thickness of 60 nm and a magnetic layer 4 having a film thickness of 22 nm arranged in that order. The magnetic layer 4 such as a $Co_{75}Cr_{13}Pt_{12}$ magnetic layer is made of at least Co, Cr and Pt. Also, the magnetic recording medium further comprises a protective layer 5 having a thickness of 10 nm and made of carbon for covering the magnetic layer 4, and a lubricating layer 6 arranged on the protective layer 5.

The non-magnetic substrate 1 is made of a material selected from among glass, amorphous carbon, $Al_2O_3$, Al-Nip (or two-layer structure of an Al layer and an NiP layer) and amorphous silicon. The Cu layer 2, the Cr layer 3, the magnetic layer 4 and the protective layer 5 are respectively deposited according to a sputtering method by using a DC magnetron sputtering drive.

Next, an appropriate value of the film thickness of the Cu layer 2 is described.

Figure 2:
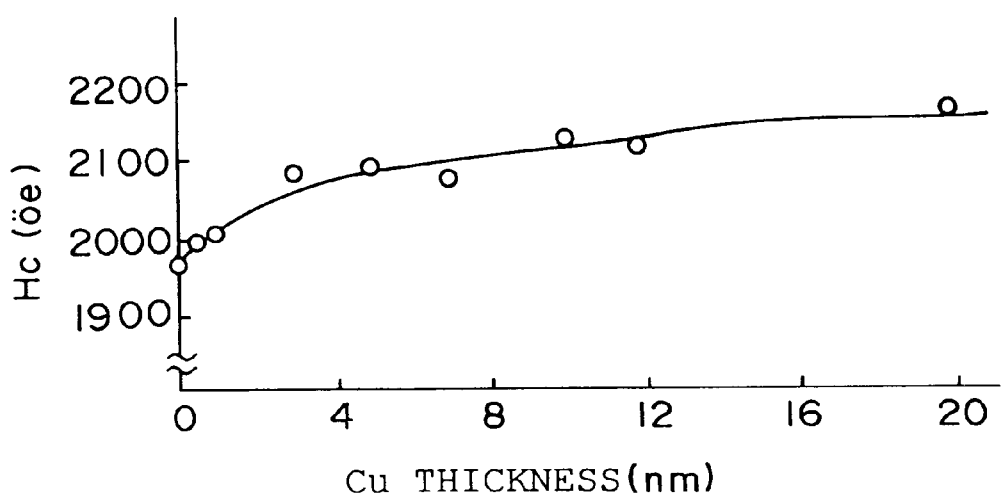
FIG. 2 shows a coercive force (Hc) of a magnetic layer changing with a film thickness of a Cu layer shown in FIG. 1.

FIG. 2 shows a coercive force (Hc) of the magnetic layer 4 changing with the film thickness of the Cu layer 2.

As shown in FIG. 2, a coercive force (Hc) of the magnetic layer 4 becomes gradually stronger as the film thickness of the Cu layer 2 is increased. In this case, a Br·t value of the magnetic layer 4 defined as a product of a residual magnetic flux density (Br) in the magnetic layer 4 and a thickness (t) of the magnetic layer 4 is maintained to about 120 G$\mu$m during a magnetic property estimating operation in which a plurality of values of the coercive force (Hr) are obtained while changing the film thickness of the Cu layer 2 from 0 nm to 20 nm.

Figure 3:
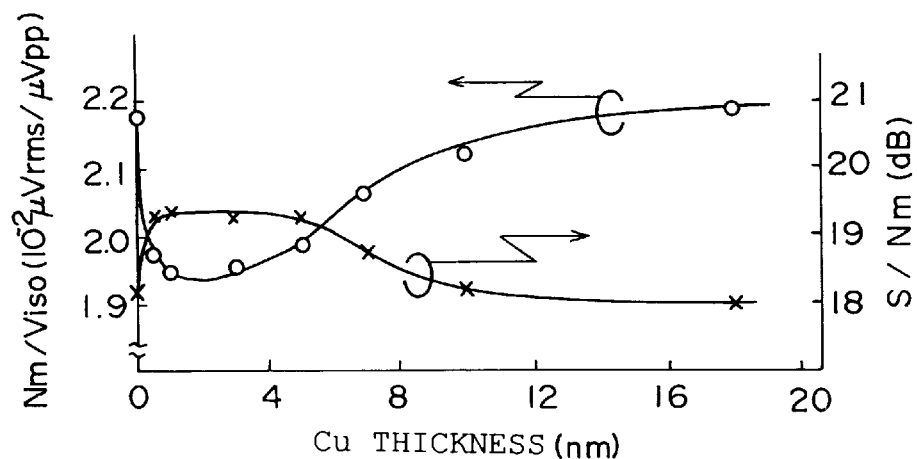
FIG. 3 shows recording and reproducing properties of the magnetic recording medium shown in FIG. 1 changing with a film thickness of a Cu layer on condition that a recording density is 80 kilo flux change per inch.

FIG. 3 shows recording and reproducing properties (a medium noise and a signal-to-noise ratio) of the magnetic recording medium changing with the film thickness of the Cu layer 2 on condition that a recording density of information is 80 kilo flux change per inch (kFCI).

As shown in FIG. 3, as the film thickness of the Cu layer 2 is decreased in a range from 10 to 20 nm, a medium noise (Nm/Viso) of the magnetic recording medium is gradually decreased, and a signal-to-noise ratio (or a medium S/N ratio) of the magnetic recording medium is gradually increased. Also, as the film thickness of the Cu layer 2 is decreased in a range from 0.5 to 10 nm, the medium noise is abruptly decreased, and the medium S/N ratio is abruptly increased. In particular, a value of the medium noise for the film thickness of the Cu layer 2 ranging from 0.5 to 5 nm is decreased by 10% or more as compared with another value of the medium noise for the Cu layer 2 having the film thickness of 18 nm, and a value of the medium S/N ratio for the film thickness of the Cu layer 2 ranging from 0.5 to 5 nm is increased by about 15% as compared with another value of the medium S/N ratio for the Cu layer 2 having the film thickness of 18 nm. Therefore, it is realized that the film thickness of the Cu layer 2 greatly influences the medium noise and the medium S/N ratio.

The reason that the medium noise and the medium S/N ratio abruptly changes with the film thickness of the Cu layer 2 ranging from 0.5 to 10 nm is as follows. When the film thickness of the Cu layer 2 ranges from 0.5 to 10 nm, an upper surface of the non-magnetic substrate 1 is partially covered with the Cu layer 2. In other words, the Cu layer 2 formed in an island-shaped film structure is arranged on the non-magnetic substrate 1. Therefore, a crystal structure of the Cr layer 3 arranged on the Cu layer 2 is made fine. In contrast, when the film thickness of the Cu layer 2 is more than 10 nm, all upper surface of the non-magnetic substrate 1 is covered with the Cu layer 2. In other words, the Cu layer 2 formed in a so-called continuous structure is arranged on the non-magnetic substrate 1, and the Cr layer 3 grows on the Cu layer to form large crystal grains. Therefore, the medium noise is increased, and the medium S/N ratio is decreased. By considering the coercive force, the medium noise and the medium S/N ratio. it is preferred that the film thickness of the Cu layer 2 range from 0.5 to 10 nm.

In the Published Unexamined Japanese Patent Application No. H6-96431 described above, it is concluded that it is preferred to increase a film thickness of a Cu layer for the purpose of increasing a coercive force of a medium. However, it is realized according to this embodiment that the medium noise cannot be sufficiently reduced and the medium S/N ratio cannot be sufficiently enhanced when the film thickness of the Cu layer is increased.

Figure 4:
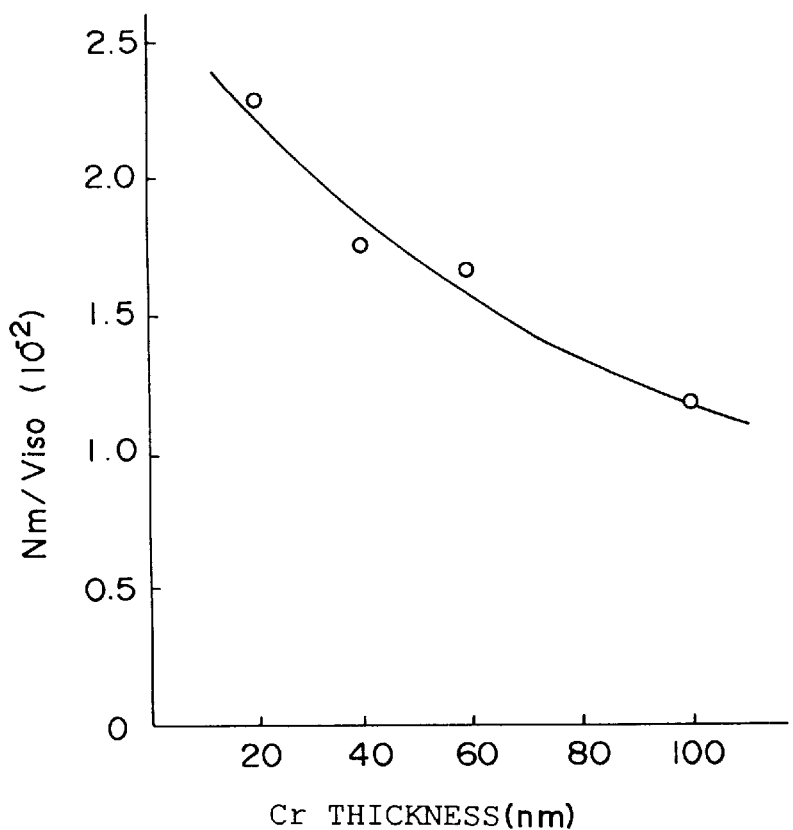
FIG. 4 shows a correlation between a film thickness of a Cr layer and the medium noise of the magnetic recording medium shown in FIG. 1.

FIG. 4 shows a correlation between a film thickness of the Cr layer 3 and the medium noise of the magnetic recording medium according to the first embodiment of the present invention.

To obtain experimental results shown in FIG. 4, the magnetic recording medium is manufactured by depositing the layers 2 to 5 on the non-magnetic substrate 1 made of Al-NiP according to a DC magnetron sputtering method in an atmosphere of a substrate temperature of 100° C. and an Ar gas pressure of 18 mTorr. In this case, any substrate bias is not applied. Also, the MR head is used to estimate magnetic properties of the magnetic recording medium, a distance of a pair of shield magnetic poles in the MR head is set to 0.4 $\mu$m, and a magnetic spacing between the MR head and the magnetic layer 4 is set to 0.1 $\mu$m. Also, a film thickness of the Cu layer 2 arranged between the non-magnetic substrate 1 and the Cr layer 3 is set to 1 nm, and a film thickness of the magnetic layer 4 is set to 22 nm. In cases where a sample of the magnetic recording medium is manufactured in the above film-forming conditions, the medium noise of the magnetic recording medium is minimized when the film thickness of the Cr layer 3 is increased to about 100 nm. Therefore, it is realized that it is sufficient to form the Cr layer 3 arranged under the magnetic layer 4 at a film thickness of about 100 nm for the purpose of forming the $Co_{75}Cr_{13}Pt_{12}$ magnetic layer 4 having a low noise property. In cases where an efficient manufacturing of the magnetic recording medium is considered, it is preferred that each of the layers 2 to 6 formed on the non-magnetic substrate 1 be thinned. Therefore, it is preferred that the film thickness of the Cr layer 3 be 100 nm or less.

In addition, other samples of the magnetic recording medium are manufactured in the above film-forming conditions by using an Al-Nip substrate, an amorphous carbon substrate and a Si monocrystal substrate having a (100) plane as a principal plane for the non-magnetic substrate 1 and by forming the Cu layer 2 having the film thickness of 1 nm, the Cr layer 3 having the film thickness of 60 nm and the magnetic layer 4 having the film thickness of 22 nm on the non-magnetic substrate 1 in that order. In this case, values of the coercive force (Hc) in the samples respectively range from 1700 to 1900 oersted. Therefore, it is ascertained that the material of the non-magnetic substrate 1 does not influence the magnetic properties of the magnetic recording medium.

To obtain experimental results shown in FIGS. 2 to 4, the magnetic layer 4 made of $Co_{75}Cr_{13}Pt_{12}$ is used. Therefore, a composition of CoCrPt in the magnetic layer 4 considered to increase the coercive force (Hc) and the medium S/N ratio is described.

Figure 5:
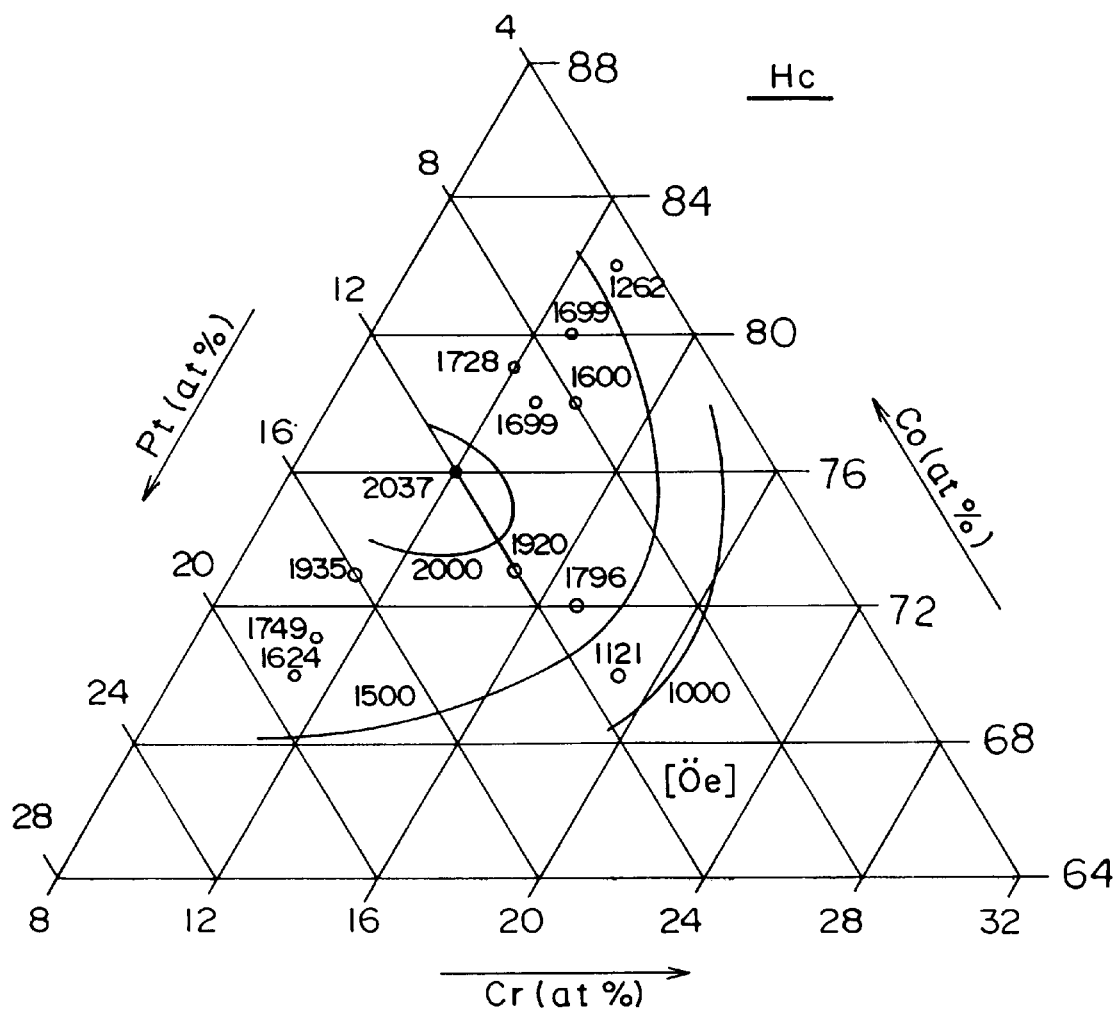
FIG. 5 is a characteristic view showing a relationship between a composition of CoCrPt in a magnetic layer and a coercive force (Hc) of a magnetic recording medium.
Figure 6:
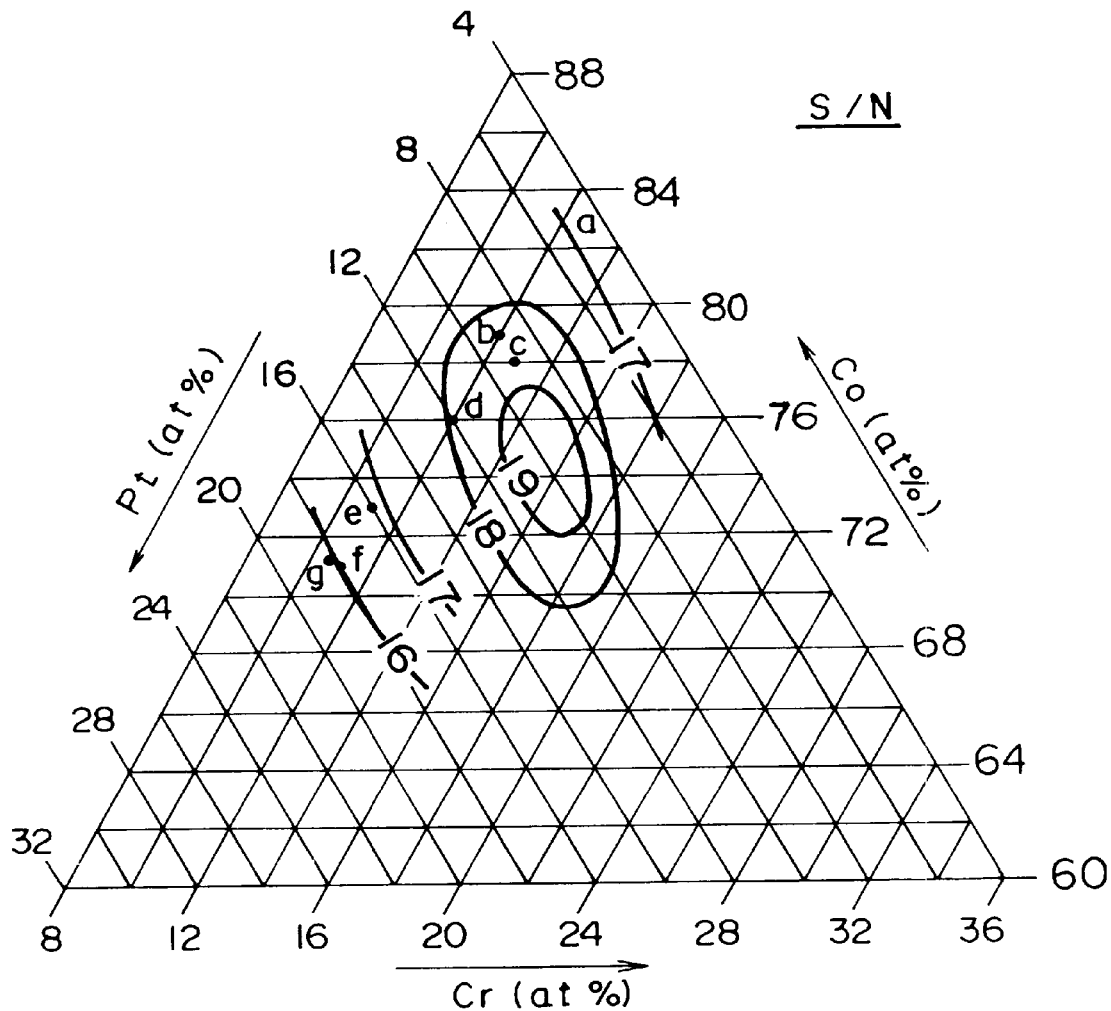
FIG. 6 is a characteristic view showing a relationship between a composition of CoCrPt in a magnetic layer and a medium S/N ratio of a magnetic recording medium.

FIG. 5 is a characteristic view showing a relationship between a composition of CoCrPt in the magnetic layer 4 and the coercive force (Hc) of a magnetic recording medium. FIG. 6 is a characteristic view showing a relationship between a composition of CoCrPt in the magnetic layer 4 and the medium S/N ratio of a magnetic recording medium.

Manufacturing conditions and magnetic property estimating conditions for a magnetic recording medium of which magnetic properties are shown in FIGS. 5 and 6 are the same as those described above. Glass is used as the material of the non-magnetic substrate 1.

As shown in FIGS. 5 and 6, in cases where a percentage content of Cr in the magnetic layer 4 ranges from 12 atoms % to 20 atoms % and a percentage content of Pt in the magnetic layer 4 ranges from 4 atoms % to 18 atoms %, the coercive force (Hc) and the medium S/N ratio in a CoCrPt type magnetic recording medium become high. Therefore, it is preferred that the magnetic layer 4 having the composition within the above composition range be used for the CoCrPt type magnetic recording medium used as a high recording density type medium.

Accordingly, even though the MR head is used to record or reproduce information in/from the magnetic recording medium according to the first embodiment, the medium noise can be sufficiently reduced, and the medium R/N ratio can be sufficiently heightened.

(Second Embodiment)

Figure 7:
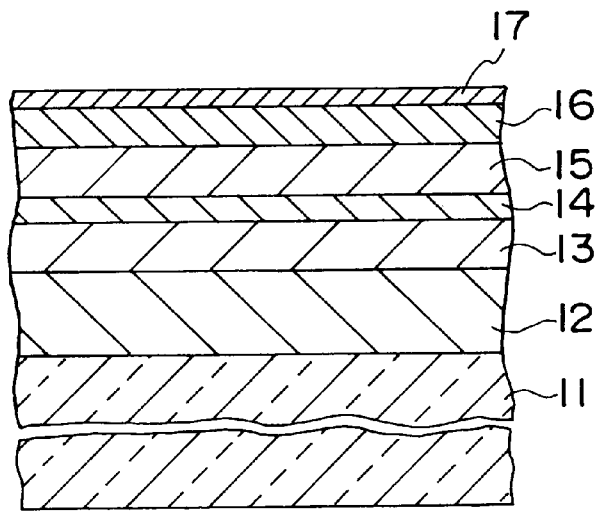
FIG. 7 is a cross sectional view of a magnetic recording medium according to a second embodiment of the present invention.

FIG. 7 is a cross sectional view of a magnetic recording medium according to a second embodiment of the present invention.

As shown in FIG. 7, a magnetic recording medium according to a second embodiment comprises a non-magnetic substrate 11, a Cr layer (or a non-magnetic crystal control layer) 12 having a film thickness of 60 nm, a first magnetic layer 13 having a film thickness of 11 nm, a Cu layer (or an intermediate layer) 14 having a film thickness ranging from 0.5 to 10 nm, a second magnetic layer 15 having a film thickness of 11 nm and a protective layer 16 having a thickness of 10 nm arranged in that order. The first and second magnetic layers 13 and 15 are respectively made of at least Co, Cr and Pt, for example, to form a $Co_{75}Cr_{13}Pt_{12}$ magnetic layer, and the protective layer 16 is made of carbon. The non-magnetic substrate 11 is made of a material selected from among glass, amorphous carbon, $Al_2O_3$, Al-NiP (or two-layer structure of an Al layer and an NiP layer) and monocrystal silicon.

Also, the magnetic recording medium further comprises a lubricating layer 17 arranged on the protective layer 16 to estimate an electro-magnetic converting property of the magnetic recording medium.

Figure 8:
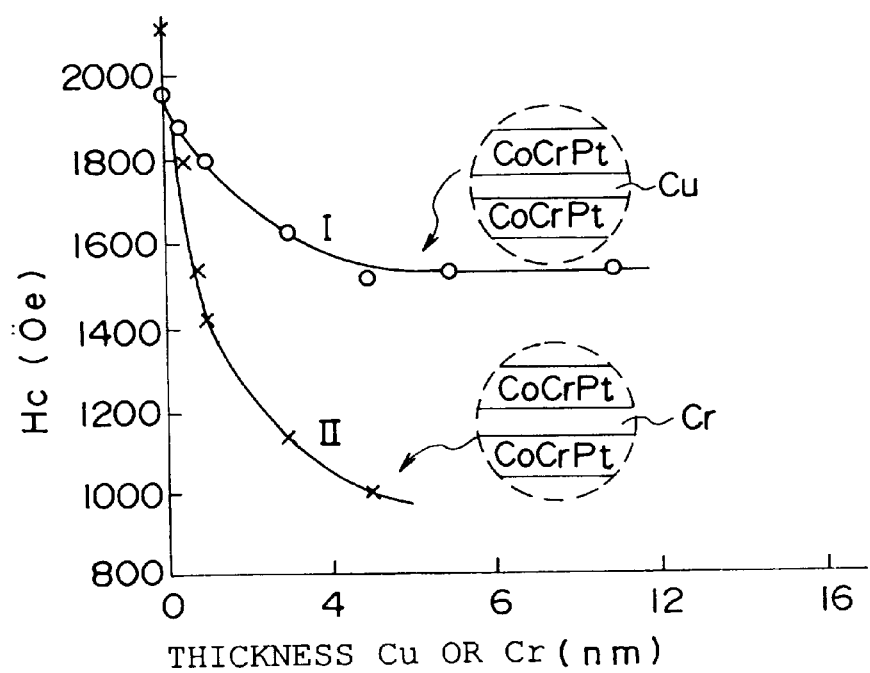
FIG. 8 shows a relationship between a film thickness of a Cu layer dividing a CoCrPt magnetic layer into first and second magnetic layers and the coercive force of the magnetic recording medium shown in FIG. 7.
Figure 9A:
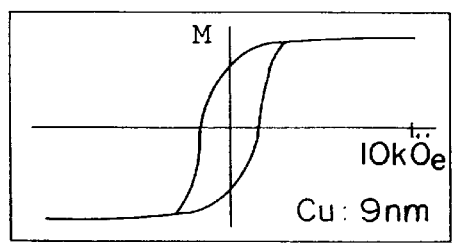
FIGS. 9(a) to 9(f) respectively show a hysteresis loop (magnetization (M)—magnetizing force (H) curved line) for the magnetic recording medium shown in FIG. 7 in which the Cu layer is arranged between the first and second magnetic layers.
Figure 9B:
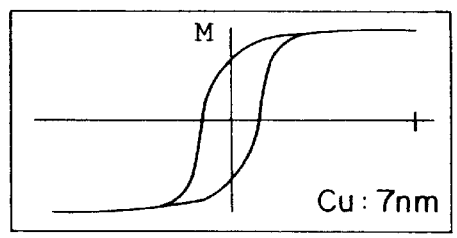
Figure 9C:
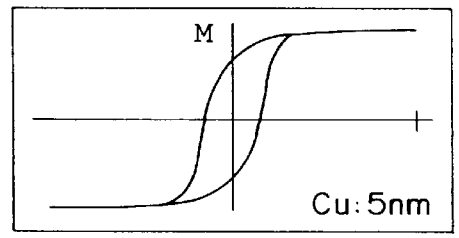
Figure 9D:
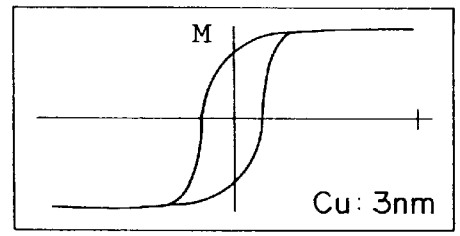
Figure 9E:
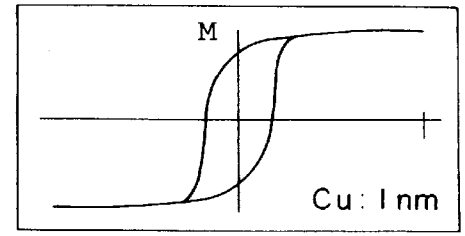
Figure 9F:
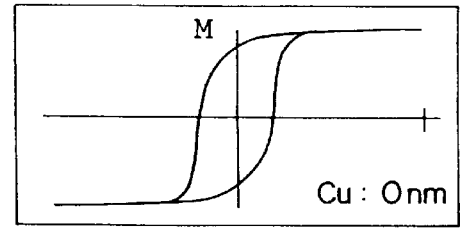
Figure 10A:
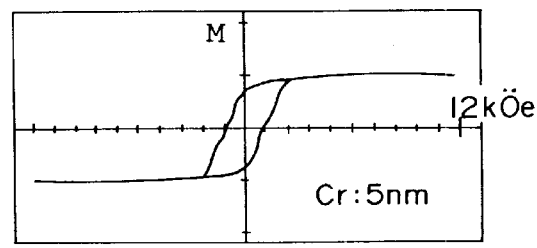
FIGS. 10(a) to 10(f) respectively show a hysteresis loop (magnetization (M)—magnetizing force (H) curved line) for a comparative sample of a magnetic recording medium in which a dividing Cr layer is arranged between first and second magnetic layers.
Figure 10B:
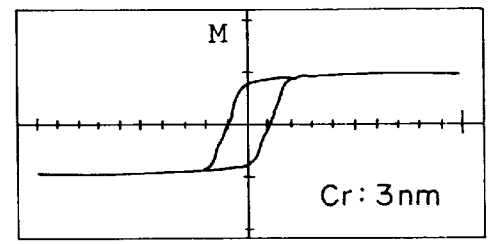
Figure 10C:
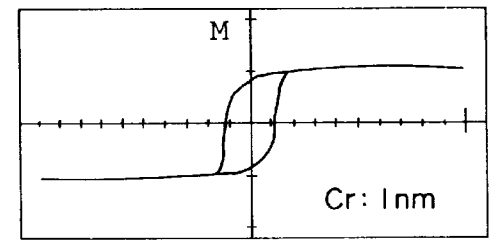
Figure 10D:
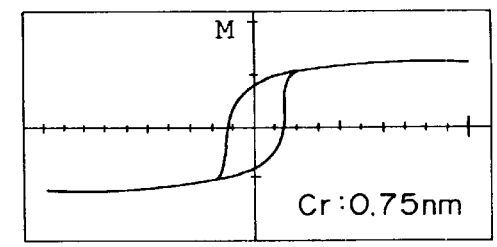
Figure 10E:
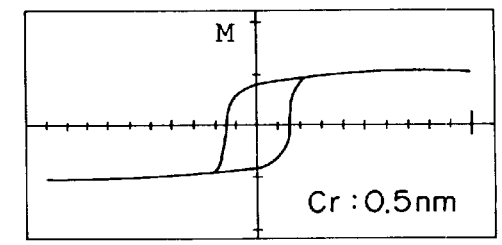
Figure 10F:
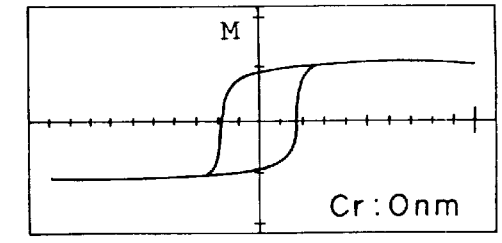

FIG. 8 shows a relationship between a film thickness of the Cu layer 14 dividing a CoCrPt magnetic layer into the first and second magnetic layers 13 and 15 and the coercive force of the magnetic recording medium. The relationship is indicated by an I-line. Also, a comparative sample of the magnetic recording medium in which a CoCrPt magnetic layer is divided into the first and second magnetic layers 13 and 15 through a dividing Cr layer (not shown) in place of the Cu layer 14 and the layers 11, 12, 13, 15 and 16 and 17 are formed in the same manner is prepared, and another relationship between a film thickness of the dividing Cr layer and the coercive force of the comparative sample is shown in FIG. 8 as a II-line.

As the I-line is shown in FIG. 8, in cases where the Cu layer 14 is arranged between the first and second magnetic layers 13 and 15, the coercive force of the magnetic recording medium is decreased and a decrease rate of the coercive force is gradually made small as the film thickness of the Cu layer 14 is increased. Therefore, the magnetic recording medium is appropriate for practical use.

In contrast, as the II-line is shown in FIG. 8, in cases where the dividing Cr layer is arranged between the first and second magnetic layers 13 and 15, the coercive force of the magnetic recording medium is abruptly decreased as the film thickness of the dividing Cr layer is increased. When the film thickness of the dividing Cr layer is 5 nm, the coercive force is decreased to 1000 oersted. Therefore, by considering the stability of the read-write characteristics of the magnetic recording medium, the magnetic recording medium is not appropriate for practical use.

FIGS. 9(a) to 9(f) respectively show a hysteresis loop (magnetic flux density (B)—magnetizing force (H) curved line) for the magnetic recording medium in which the Cu layer 14 is arranged between the first and second magnetic layers 13 and 15. A relationship between the film thickness of the Cu layer 14 and the hysteresis loop is shown in FIGS. 9(a) to 9(f). Also, FIGS. 10(a) to 10(f) respectively show a hysteresis loop (magnetic flux density (B)—magnetizing force (H) curved line) for the comparative sample of the magnetic recording medium in which the dividing Cr layer is arranged between the first and second magnetic layers 13 and 15. A relationship between the film thickness of the dividing Cr layer and the hysteresis loop is shown in FIGS. 10(a) to 10(f).

In cases where the Cu layer 14 is arranged between the first and second magnetic layers 13 and 15, as shown in FIGS. 9(a) to 9(f), even though the film thickness of the Cu layer 14 is increased, the shape of the hysteresis loop does not change so much. In contrast, in cases where the dividing Cr layer is arranged between the first and second magnetic layers 13 and 15, as shown in FIGS. 10(a) to 10(f), as the film thickness of the dividing Cr layer is increased, the shape of the hysteresis loop is deformed to generate one or more waving portions. Because of the generation of the waving portions of the hysteresis loop, turbulence in a magnetization reversed region of the magnetic recording medium is increased, and the increased turbulence causes the increase of the medium noise.

Figure 11:
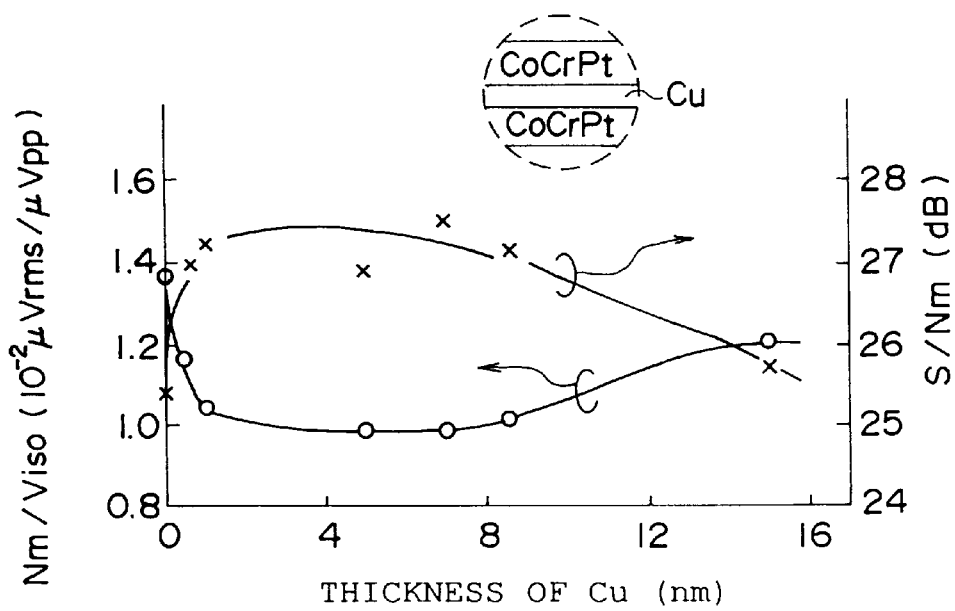
FIG. 11 shows electromagnetic converting characteristics (the medium noise and the medium S/N ratio) of the magnetic recording medium shown in FIG. 7 changing with a film thickness of a Cu layer on condition that a recording density of information is 68 kilo flux change per inch.

FIG. 11 shows electromagnetic converting characteristics (the medium noise and the medium S/N ratio) of the magnetic recording medium changing with a film thickness of the Cu layer 14 on condition that a recording density of information is 68 kilo flux change per inch. The estimating method of the electro-magnetic converting characteristics is the same as that in the first embodiment.

As shown in FIG. 11, in cases where the Cu layer 14 having a film thickness ranging from 0.5 to 10 nm is arranged between the first and second magnetic layers 13 and 15, the medium noise (Nm/Viso) is reduced by 20% as compared with that of a magnetic recording medium in which no Cu layer is arranged between the first and second magnetic layers 13 and 15, and the medium S/N ratio (S/Nm) is heightened as compared with that in case of no Cu layer.

Figure 12:
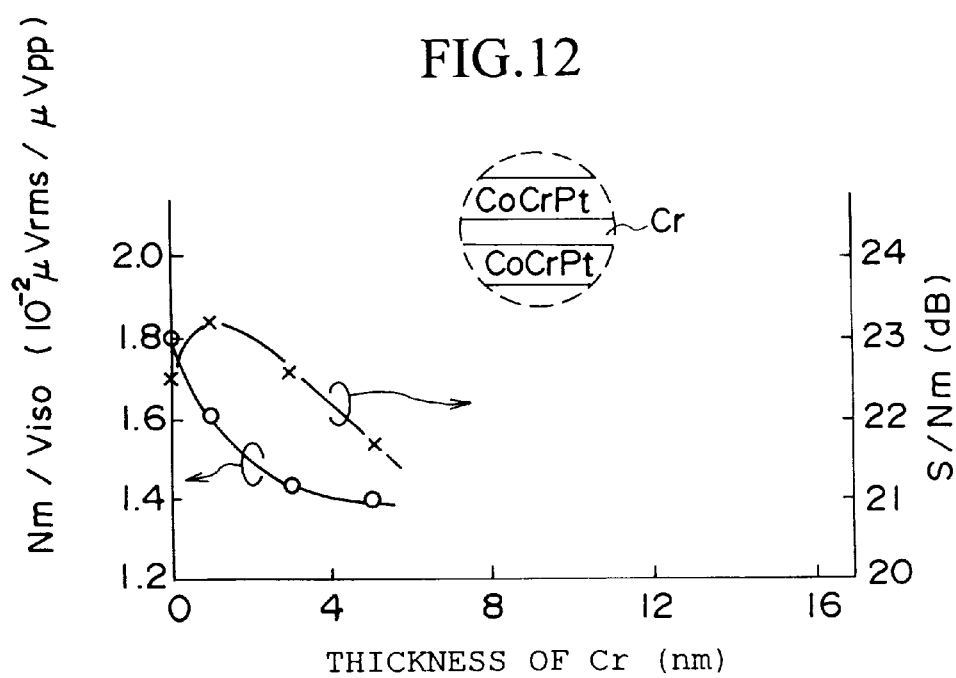
FIG. 12 shows electromagnetic converting characteristics (the medium noise and the medium S/N ratio) of a magnetic recording medium changing with a film thickness of a dividing Cr layer on condition that a recording density of information is 80 kilo flux change per inch.

FIG. 12 shows electromagnetic converting characteristics (the medium noise and the medium S/N ratio) of a magnetic recording medium changing with a film thickness of the dividing Cr layer on condition that a recording density of information is 80 kilo flux change per inch.

As shown in FIG. 12, in cases where the dividing Cu layer is arranged between the first and second magnetic layers 13 and 15, the medium noise (Nm/Viso) is reduced by 20% as compared with that in case of no Cr layer. However, as is described above, because the coercive force Hc is reduced as the film thickness of the dividing Cr layer is increased, a recording resonance ($D_{50}$) of the recording magnetic medium is also reduced. Though the medium S/N ratio is slightly improved when the film thickness of the dividing Cr layer is about 1 nm, the medium S/N ratio abruptly deteriorates when the film thickness of the dividing Cr layer is increased to a value more than 1 nm. Therefore, because a range of the film thickness of the dividing Cr layer allowed to improve the medium S/N ratio is narrow, it is required to enhance a film thickness accuracy for the formation of the dividing Cr layer. Also, even though the dividing Cr layer is arranged between the magnetic layers 13 and 15 with a high accuracy, an improved value of the medium S/N ratio is extremely lower than that of a magnetic recording medium in which the Cu layer 14 is arranged between the magnetic layers 13 and 15.

To obtain experimental results shown in FIGS. 8 to 12, the magnetic layers 13 and 15 made of $Co_{75}Cr_{13}Pt_{12}$ are used, in the same manner as in the first embodiment. Therefore, it is preferred that a composition of CoCrPt in the magnetic layers 13 and 15 be determined in the same manner as in the first embodiment to increase the coercive force (Hc) and the medium S/N ratio.

(Third Embodiment)

Figure 13:
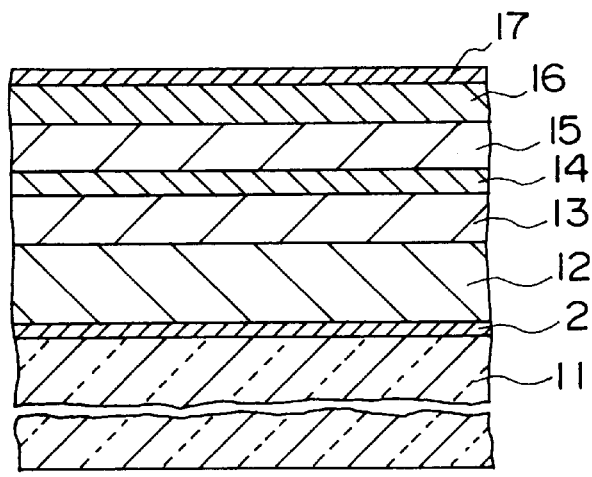
FIG. 13 is a cross sectional view of a magnetic recording medium according to a third embodiment of the present invention.

FIG. 13 is a cross sectional view of a magnetic recording medium according to a third embodiment of the present invention. Constitutional elements which are the same as those in the first or second embodiment are denoted by the same reference numerals as those shown in FIG. 1 or 7.

As shown in FIG. 13, a magnetic recording medium according to a third embodiment comprises the non-magnetic substrate 11, the Cu layer 2, the Cr layer 12, the first magnetic layer 13, the Cu layer 14, the second magnetic layer 15, the protective layer 16 and the lubricating layer 17 arranged in that order.

In the above configuration, an influence of the Cu layer 2 arranged on the substrate 11 and the Cu layer 14 arranged between the magnetic layers 13 and 15 on the medium S/N ratio of the magnetic recording medium is described with reference to Table 1.

TABLE 1

| | Cu backing (nm) | Cu separation (nm) | Medium noise ($\mu$Vrms/$\mu$Vpp) | Medium S/N ratio (dB) |
|---|---|---|---|---|
| First structure | 1 | 0 | 0.0195 | 19.2 |
| Second structure | 0 | 5 | 0.0153 | 21.2 |
| Third structure | 1 | 5 | 0.0137 | 22.4 |
| Fourth structure | 0 | 0 | 0.0212 | 18.3 |

In Table 1, measured values of the medium noise and measured values of the medium S/N ratio are listed for four types of structures. In a first structure, the Cr layer 12 and the magnetic layer 13 are formed on the Cu layer 2 which is used as a backing layer. The first structure is called a Cu backing structure, and a magnetic recording medium having the first structure corresponds to that according to the first embodiment. In a second structure, the magnetic layers 13 and 15 are separated from each other through the Cu layer 14. The second structure is called a Cu separating structure, and a magnetic recording medium having the second structure corresponds to that according to the second embodiment. In a third structure, both the Cu backing structure and the Cu separating structure are adopted. A magnetic recording medium having the third structure corresponds to that according to the third embodiment. In a fourth structure, neither the Cu backing structure nor the Cu separating structure is adopted. Here, the film thickness of the Cu layer 2 arranged on the substrate 11 is set to 1 nm, the film thickness of the Cu layer 14 arranged between the magnetic layers 13 and 15 is set to 5 nm, the film thickness of the Cr layer 3 or 12 is set to 60 nm, and a recording density of information recorded in each of the magnetic recording mediums is 80 kilo flux change per inch. In case of the third structure according to the third embodiment, a summed thickness of the first and second magnetic layers 13 and 15 is 22 nm.

As shown in Table 1, because the Cu backing structure or the Cu separating structure is adopted, as is described above, it is ascertained that the medium noise is decreased and the medium S/N ratio is heightened. Also, because both the Cu backing structure and the Cu separating structure are adopted in the third embodiment, the medium noise is decreased by 40% as compared with that in the fourth structure, and the medium S/N ratio is extremely heightened.

Figure 14:
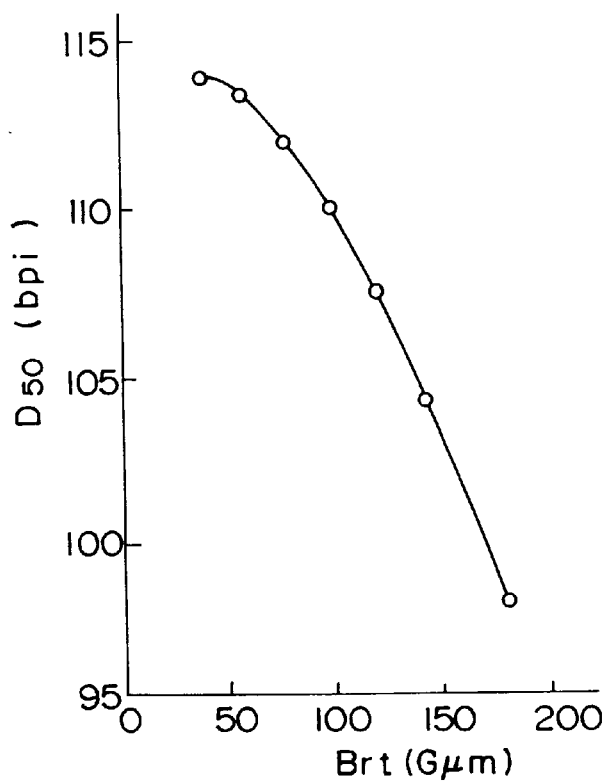
FIG. 14 shows a relationship between a Br·t value and a recording resonance ($D_{50}$) in the recording magnetic medium shown in FIG. 13.

FIG. 14 shows a relationship between the Br·t value and the recording resonance ($D_{50}$) in the recording magnetic medium according to the third embodiment. In this case, the film thickness of the Cu layer 2 arranged on the substrate 11 is set to 1 nm, the film thickness of the Cr layer 12 is 60 nm, and a summed thickness of the first and second magnetic layers 13 and 15 is 21.6 nm. To estimate the relationship, the MR head is used, a distance of a pair of shield magnetic poles in the MR head is set to 0.4 $\mu$m, and a magnetic spacing between the MR head and the second magnetic layer 15 is set to 0.1 $\mu$m.

In cases where the MR head is used, as one or more layers composing a magneto-resistance (MR) device are thinned, a magnetizing rotation of the MR device is enlarged, and a larger resistance change is obtained. Therefore, the sensitivity for detecting information recorded in the magnetic recording medium is moreover heightened. In this case, when a magnetic field generated by the magnetic recording medium is too strong, the magnetization of the MR device is undesirable saturated. Therefore, when a high sensitivity type MR device is used, it is required that the Br·t value of the magnetic recording medium is not too high. That is, as shown in FIG. 14, in cases where the magnetic recording medium in which the recording resonance ($D_{50}$) reaches 100 kbits per inch (kBPI) is used, it is preferred that the Br·t value of the magnetic recording medium be 150 G$\mu$m or less.

Also, in cases where the Cu backing structure is only adopted and a magnetic layer made of CoCrPt is arranged on the Cr layer 3 or 12, the same relationship can be obtained.

(Fourth Embodiments)

Next, the fourth embodiment is described.

Figure 15:
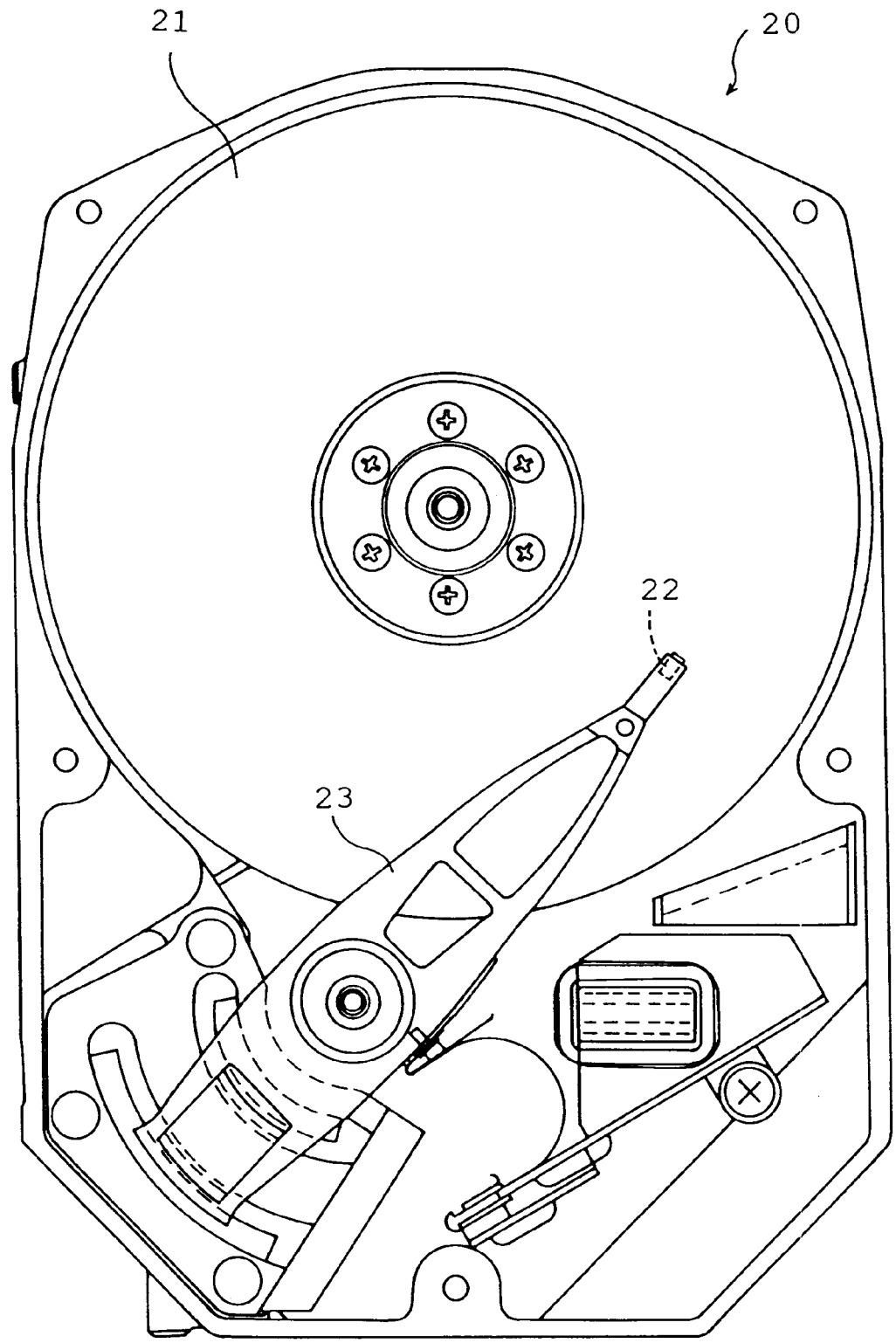
FIG. 15 is a plan view of a magnetic recording drive mainly composed of a slider and a magnetic disk according to the fourth embodiment of the present invention.

FIG. 15 is a plan view of a magnetic recording drive mainly composed of a slider and a magnetic disk according to the fourth embodiment of the present invention.

As shown in FIG. 15, a magnetic recording drive 20 comprises the magnetic disk 21, the slider 22 having MR head, and a spring arm for supporting the slider 22.

The surface of the magnetic disk 21 is partitioned into a data zone placed at the outermost side, a stop zone at which the movement of the slider is stooped, and a contact start stop (CSS) zone placed at the innermost side. When information is read or written from/in the magnetic disk, the slider flies on the data zone of the magnetic disk.

Therefore, the magnetic recording drive 20 can be manufactured by using the magnet disk 21 according to the present invention.

(Other Embodiments)

In the second and third embodiments, a magnetic layer is divided into the two magnetic layers 13 and 15 through the Cu layer 14. However, it is applicable that a magnetic layer be divided into three or more magnetic layers through a plurality of Cu layers.

Also, the Cu layer 2 is arranged between the non-magnetic substrate 1 or 11 and the Cu layer 14 is arranged between the magnetic layers 13 and 15 made of CoCrPt. However, it is applicable that a layer including Cu as a primary component be used in place of the Cu layer 2 or 14.

The magnetic recording mediums according to the embodiments are respectively used for a magnetic recording drive such as a magnetic disk drive, a magnetic card drive or the like.

What is claimed is:

1. A magnetic recording medium, comprising:
   a non-magnetic substrate;
   an intermediate layer arranged on the non-magnetic substrate on condition that the non-magnetic substrate is partially covered with the intermediate layer formed in an island-shaped film structure, a film thickness of the intermediate layer ranging from 0.5 nm to 10 nm, and the intermediate layer being made of copper;
   a non-magnetic crystal control layer arranged on the intermediate layer, the non-magnetic crystal control layer being made of chromium or a material in which chromium is included as a primary component; and
   a magnetic layer arranged on the non-magnetic crystal control layer, the magnetic layer being made of alloy in which Co, Cr and Pt are included;
   wherein a percentage content of Cr in the magnetic layer ranges from 12 atoms % to 20 atoms % and a percentage content of Pt in the magnetic layer ranges from 4 atoms % to 18 atoms %.

2. The magnetic recording medium according to claim 1, wherein a film thickness of the non-magnetic crystal control layer is 100 nm or less.

3. A magnetic recording medium according to claim 1, wherein the non-magnetic substrate is made of a material selected from the group consisting of glass, carbon, $Al_2O_3$ and silicon or has a two-layer structure formed of Al and NiP.

4. The magnetic recording medium according to claim 1, wherein a Br·t value of the magnetic layer defined as a product of a residual magnetic flux density in the magnetic layer and a thickness of the magnetic layer is 150 G$\mu$m or less.

5. A magnetic recording medium, comprising:
   a non-magnetic substrate;
   a non-magnetic crystal control layer arranged on the non-magnetic substrate, the non-magnetic crystal control layer being made of chromium or a material in which chromium is included as a primary component;
   a plurality of magnetic layers arranged on the non-magnetic crystal control layer, each of the magnetic layers being made of alloy in which Co, Cr and Pt are included; and
   one or more intermediate layers respectively arranged between the magnetic layers, a film thickness of each of the intermediate layers ranging from 0.5 nm to 10 nm, and the intermediate layers being made of copper;
   wherein a percentage content of Cr in the magnetic layer ranges from 12 atoms % to 20 atoms % and a percentage content of Pt in the magnetic layer ranges from 4 atoms % to 18 atoms %.

6. The magnetic recording medium according to claim 5, wherein a film thickness of the non-magnetic crystal control layer is 100 nm or less.

7. A magnetic recording medium according to claim 5, wherein the non-magnetic substrate is made of a material selected from the group consisting of glass, carbon, $Al_2O_3$ and silicon or has a two-layer structure formed of Al and NiP.

8. The magnetic recording medium according to claim 5, wherein Br·t value of the magnetic layer defined as a product of a residual magnetic flux density in the magnetic layer and a thickness of the magnetic layer is 150 G$\mu$m or less.

9. A magnetic recording medium, comprising:
   a non-magnetic substrate;
   a first intermediate layer arranged on the non-magnetic substrate on condition that the non-magnetic substrate is partially covered with the first intermediate layer formed in island-shaped film structure, a film thickness of the first intermediate layer ranging from 0.5 nm to 10 nm, and the first intermediate layer being made of copper; p1 a non-magnetic crystal control layer arranged on the first intermediate layer, the non-magnetic crystal control layer being made of chromium or a material in which chromium is included as a primary component;
   a plurality of magnetic layers arranged on the non-magnetic crystal control layer, each of the magnetic layers being made of alloy in which Co, Cr and Pt are included; and
   one or more second intermediate layers respectively arranged between the magnetic layers, a film thickness of each of the second intermediate layers ranging from 0.5 nm to 10 nm, and each of the second intermediate layers being made of copper;
   wherein a percentage content of Cr in the magnetic layer ranges from 12 atoms % to 20 atoms % and a Percentage content of Pt in the magnetic layer ranges from 4 atoms % to 18 atoms %.

10. The magnetic recording medium according to claim 9, wherein a film thickness of the non-magnetic crystal control layer is 100 nm or less.

11. A magnetic recording medium according to claim 9, wherein the non-magnetic substrate is made of a material selected from the group consisting of glass, carbon, $Al_2O_3$ and silicon or has a two-layer structure formed of Al and NiP.

12. The magnetic recording medium according to claim 9, wherein a Br·t value of the magnetic layer defined as a product of a residual magnetic flux density in the magnetic layer and a thickness of the magnetic layer is 150 G$\mu$m or less.

13. A magnetic recording apparatus, comprising:

a magnetoresistive effect type magnetic head;

a magnetic recording medium for recording information written with the magnetoresistive effect type magnetic head, the information being reproduced through the magnetoresistive effect type magnetic head, and the magnetic recording medium including a non-magnetic substrate;

an intermediate layer arranged on the non-magnetic substrate, a film thickness of the intermediate layer ranging from 0.5 nm to 10 nm, and the intermediate layer being made of copper;

a non-magnetic crystal control layer arranged on the intermediate layer, the non-magnetic crystal control layer being made of chromium or a material in which chromium is included as a primary component; and a magnetic layer arranged on the non-magnetic crystal control layer, the magnetic layer being made of alloy in which Co, Cr and Pt are included;

wherein a percentage content of Cr in the magnetic layer ranges from 12 atoms % to 20 atoms % and a Percentage content of Pt in the magnetic layer ranges from 4 atoms % to 18 atoms %.

14. A magnetic recording apparatus, comprising:

a magnetoresistive effect type magnetic head;

a magnetic recording medium for recording information written with the magnetoresistive effect type magnetic head, the information being reproduced through the magnetoresistive effect type magnetic head, the magnetic recording medium including a non-magnetic substrate;

a non-magnetic crystal control layer arranged on the non-magnetic substrate, the non-magnetic crystal control layer being made of chromium or a material in which chromium is included as a primary component;

a plurality of magnetic layers arranged on the non-magnetic crystal control layer, each of the magnetic layers being made of alloy in which Co, Cr and PT are included; and one or more intermediate layers respectively arranged between the magnetic layers, a film thickness of each of the intermediate layers ranging from 0.5 nm to 10 nm, and the intermediate layers being made of copper;

wherein a percentage content of Cr in the magnetic layer ranges from 12 atoms % to 20 atoms % and a Percentage content of Pt in the magnetic layer ranges from 4 atoms % to 18 atoms %.

15. A magnetic recording apparatus, comprising:

a magnetoresistive effect type magnetic head;

a magnetic recording medium for recording information written with the magnetoresistive effect type magnetic head, the information being reproduced through the magnetoresistive effect type magnetic head, the magnetic recording medium including a non-magnetic substrate;

a first intermediate layer arranged on the non-magnetic substrate, a film thickness of the first intermediate layer ranging from 0.5 nm to 10 nm, and the first intermediate layer being made of copper;

a non-magnetic crystal control layer arranged on the first intermediate layer, the non-magnetic crystal control layer being made of chromium or a material in which chromium is included as a primary component;

a plurality of magnetic layers arranged on the non-magnetic crystal control layer, each of the magnetic layers being made of alloy in which Co, Cr and PT are included; and one or more second intermediate layers respectively arranged between the magnetic layers, a film thickness of each of the second intermediate layers ranging from 0.5 nm to 10 nm, and each of the second intermediate layers being made of copper;

wherein a percentage content of Cr in the magnetic layer ranges from 12 atoms % to 20 atoms % and a Percentage content of Pt in the magnetic layer ranges from 4 atoms % to 18 atoms %.

* * * * *

UNITED STATES PATENT AND TRADEMARK OFFICE
CERTIFICATE OF CORRECTION

PATENT NO. : 5,900,323
DATED : May 4, 1999
INVENTOR(S) : Okamoto et al.

It is certified that error appears in the above-identified patent and that said Letters Patent is hereby corrected as shown below:

On the title page:

Under "[57] Abstract", please delete the existing Abstract and insert as follows -- A magnetic recording medium has a non-magnetic substrate, a Cu layer having a film thickness ranging from 0.5 to 10nm, a non-magnetic Cr layer, a magnetic layer made of CoCrPt alloy in which a percentage content of Cr ranges from 12 atoms % to 20 atoms % and a percentage content of Pt ranges from 4 atoms % to 18 atoms %, a protective layer and a lubricating layer, arranged in that order. In addition, it is preferred that another Cu layer having a film thickness ranging from 0.5 to 10nm be inserted into the magnetic layer to divide the magnetic layer into two layers. -- therefor

UNITED STATES PATENT AND TRADEMARK OFFICE
CERTIFICATE OF CORRECTION

PATENT NO. : 5,900,323
DATED : May 4, 1999
INVENTOR(S) : Okamoto et al

It is certified that error appears in the above-indentified patent and that said Letters Patent is hereby corrected as shown below:

Column 12, line 39, after "wherein" insert --a--

Column 12, line 50, delete "p1" and after "copper;" start a new line with "a non-magnetic"

Signed and Sealed this

Third Day of April, 2001

*Attest:*

NICHOLAS P. GODICI

*Attesting Officer*    Acting Director of the United States Patent and Trademark Office